Nov. 28, 1967 E. O. P. TATTER ETAL 3,355,176

SPINDLE ADAPTER

Filed May 11, 1965

Inventors,
Ernest O. P. Tatter,
Philip Vazzano
By Hofgren, Wegner,
Allen, Stellman & McCord
Attys United States Patent Office 3,355,176

Patented Nov. 28, 1967

3,355,176
SPINDLE ADAPTER

Ernest O. P. Tatter, Addison, and Philip Vazzano, Des Plaines, Ill., assignors to Warwick Electronics Inc., a corporation of Delaware Filed May 11, 1965, Ser. No. 454,842
7 Claims. (Cl. 274—10)

ABSTRACT OF THE DISCLOSURE

An adapter usable with a record changer having a small hole spindle including a lower portion and a pivotally mounted upper portion that is movable between a record supporting position in alignment with the lower portion and a record ejecting position offset with respect to the lower portion. The adapter includes an elongate passage in the adapter body that is received over the small hole spindle, and a single pivotally mounted vertically movable lever is provided on the adapter body, and is engageable with the upper portion of the small hole spindle for ejecting the lowermost large hole record from a supporting shelf on the adapter body.

This invention relates in general to a spindle adapter for a record changer, and more particularly to an adapter enabling a record changer having a small diameter spindle to play records having a large diameter center hole.

In the record changer spindle adapter field, it is old to provide a generally cylindrical adapter body with a mechanism operative adjacent a large hole record support level in response to actuation of a small hole spindle ejector mechanism, to eject a large hole record off of the adapter support means. Known types of large hole record ejecting mechanisms have employed a plurality of movable elements for shifting large hole records off of an adapter support means, and these mechanisms have proved to be not only expensive to manufacture and difficult to assemble, but also extremely unreliable in use. Additionally, the cylindrical adapter body configuration has inhibited the free movement of large hole records onto an adapter record support means, and has also created an excessive frictional drag on the hole of the record during playing thereof.

Accordingly, the general purpose of the present invention is to provide a spindle adapter for use with large hole records which obviates the problems noted above, and which will function in a manner superior to known devices.

An object of the invention is to provide a spindle adapter which is shaped so as to define means for threading large hole records onto a record supporting shelf, and to define means for guiding records during the playing thereof; said spindle adapter being of the type which will function satisfactorily with a minimum number of moving parts so as to be susceptible of easy and inexpensive manufacture.

Another object of the invention is to provide a spindle adapter as described above with a single movable member which is actuated by movement of the second spindle body portion into the record ejecting position to eject the lowermost record in the record stack supported on the adapter shelf means.

A further object of the invention is to provide a spindle adapter as described above which is substantially rectangular in cross-section from top to bottom thereof to facilitate threading of records onto the adapter record support means, and to minimize the frictional drag on a record being played.

These and other objects of the invention will hereinafter become more fully apparent from the following detailed description taken in connection with the annexed drawing, wherein.

Figures 1, 2:
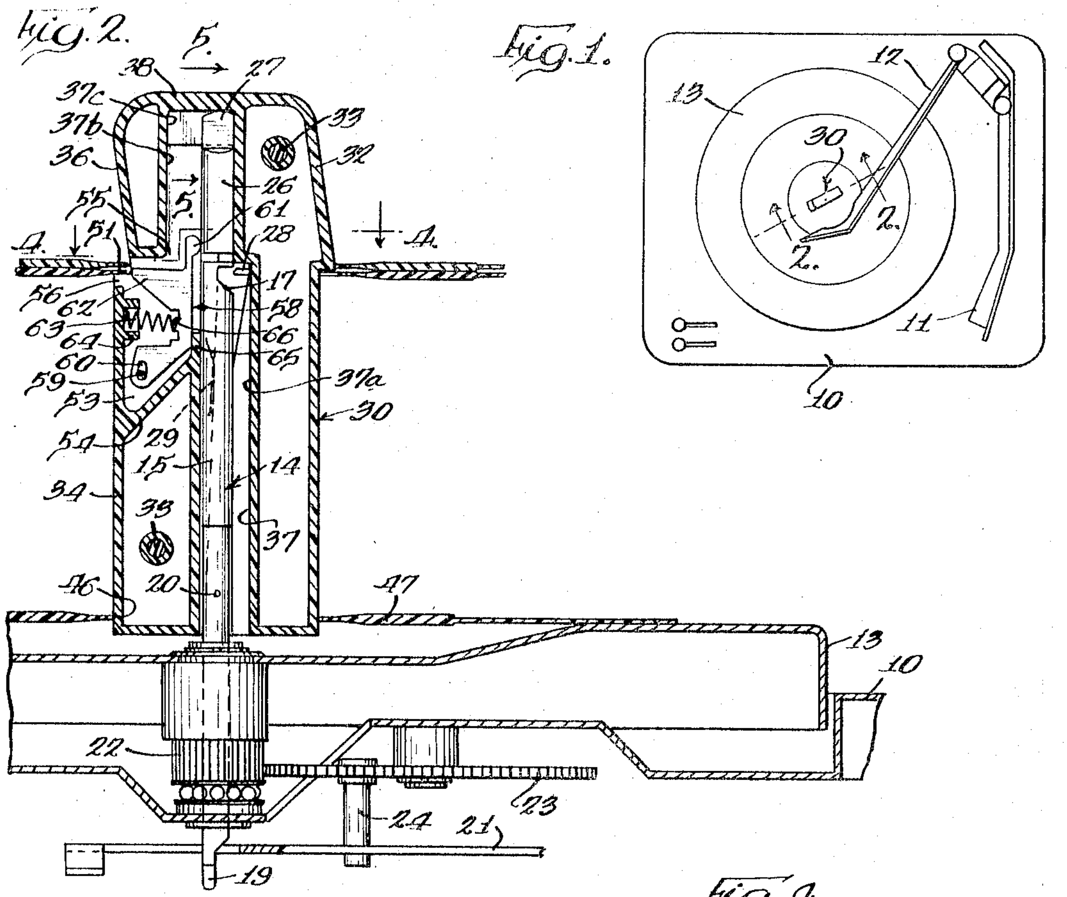
FIG. 1 is a plan view of a record player utilizing a preferred embodiment of the invention.
FIG. 2 is an enlarged section view taken generally along line 2—2 of FIG. 1, and showing the mechanism in a record supporting position.

While this invention is susceptible of embodiment in many different forms, there is shown in the drawing and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

The spindle adapter of the present invention is particularly adapted for use with a record changer having a small hole spindle including a generally cylindrical first portion with a longitudinal slot extending from end to end thereof, and a second portion pivotally mounted in the slot and having a cylindrical section extending vertically thereabove. The second spindle portion includes a generally horizontally disposed shelf intermediate the ends thereof for supporting a stack of small hole records, and spring means bias the shelf to a record supporting position disposed outwardly of the slot in the first spindle portion. The first spindle portion is adapted to be fixed on a record changer motorboard, and the lower end of the second spindle portion extends below the lower end of the first spindle portion into position for engagement by record changing mechanism which pivots the second spindle portion into a record ejecting position wherein the shelf is disposed within the slot in the first spindle portion. The cylindrical section of the second spindle portion is normally disposed in concentric relation with the first spindle portion, and when the second spindle portion is pivoted to eject a record, the cylindrical section thereof moves to a position eccentrically disposed with respect to the first spindle portion, to shift the stack of records disposed above the lowermost ejected record into a position supported by the top of the first spindle portion. After the lowermost record in the record stack has been ejected and the second spindle portion is returned to the record supporting position, the cylindrical section of the second spindle portion shifts the remaining records in the record stack off of the top of the first spindle portion into a position of support on the second spindle portion shelf.

The spindle adapter of this invention is provided for association with a record changer, as shown in FIG. 1, that includes a motorboard 10 having a tone arm 11 and a record hold down arm 12. The hold down arm 12 has an operative position as shown in FIG. 1 in which it rests upon the uppermost record of a record stack (not shown) to support the stack of records, and can more to an inoperative position adjacent the tone arm as shown in FIG. 1 for placement or removal of records. The changer has a turnable 13 rotatably mounted on the motorboard 10, and a small hole record spindle 14 extends upwardly centrally of the turntable and is fixed to the motorboard, so that the turntable rotates relative to the spindle.

Spindle 14 includes a first portion 15 that includes a substantially cylindrical lower section (FIG. 6) for rotatably guiding a small hole record during playing thereof.

A longitudinal slot 16 extends from end to end of the spindle portion 15, and a transverse groove 17 is provided at the upper end of spindle portion 15 to define a shoulder 18 at the top of the spindle portion 15.

A second spindle member 19 is pivotally mounted within slot 16 intermediate the ends thereof by a transverse pin 20. As can be best seen in FIG. 2, the lower end of spindle portion 19 extends below the motorboard 10 into position for actuation by a movable slide member 21. As is well known in the art, slide member 21 is reciprocated by drive means including a pinion 22 fixed to the turntable 13, and adapted to mesh with a mutilated drive gear 23 rotatably mounted on the motorboard 10 and carrying a drive pin 24 for moving slide 21. The non-toothed portion of gear 23 is normally positioned adjacent pinion 22, so that the gear 23 does not rotate during normal playing of a record, and conventional record change means, not shown, move the teeth on gear 23 into mesh with the teeth on a pinion 22 to effect a record change cycle and pivot spindle portion 19.

Figure 3:
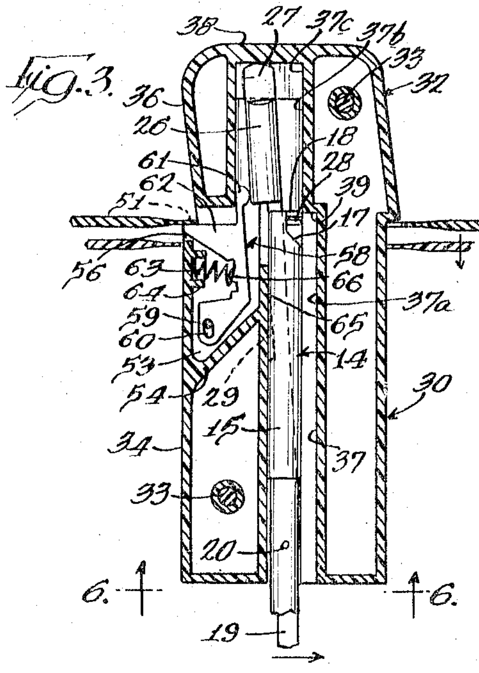
FIG. 3 is a fragmentary section view similar to FIG. 2, and showing the mechanism in a record ejecting position.

The upper end of spindle portion 19 extends above the upper end of spindle portion 15, and includes a generally cylindrical section 26 for centering of small hole records, and a section of reduced thickness 27 thereabove to facilitate the threading of small hole records onto cylindrical section 26. Spindle member 19 includes a generally horizontally disposed small hole record supporting shelf 28 between the ends thereof, and shelf 28 is movable between a record supporting position disposed outwardly of groove 17 (FIG. 2) to a record ejecting position disposed within groove 17 (FIG. 3). Spring means, such as a leaf spring 29, are provided in slot 16 to bias the shelf 28 toward the record supporting position. It will be noted by comparing FIGS. 2 and 3, that in the record supporting position the cylindrical section 26 of spindle member 19 is disposed generally concentrically with spindle member 15, while in the record ejecting position shown in FIG. 3, the cylindrical section is eccentrically disposed with respect to spindle portion 15.

Figure 4:
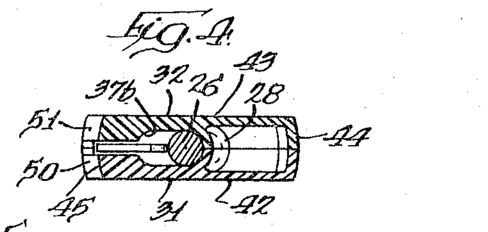
FIG. 4 is a sectional view taken generally along line 4—4 of FIG. 2.
Figure 5:
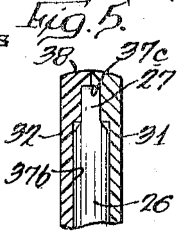
FIG. 5 is a sectional view taken generally along line 5—5 of FIG. 2.
Figure 6:
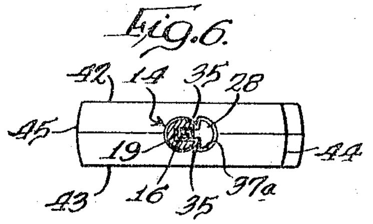
FIG. 6 is a bottom plan view taken generally along line 6—6 of FIG. 3.

The illustrated spindle adapter embodiment is indicated generally at 30, and is formed of two similar parts 31 and 32 suitably secured together as by adhesive or, as shown, by a plurality of machine screws 33. The adapter body formed by the parts 31 and 32 is generally rectangular in cross-section throughout the height thereof as shown in FIGS. 4 and 6; and is defined by a lower section 34, and an upper section 36. Extending longitudinally through the adapter body is a central passage 37 for receiving the small hole record spindle 14, and the height of the adapter relative to the turntable is fixed by engagement of a capped portion 38 of the adapter's upper section with the top of the small hole record spindle. Passage 37 includes a lower portion 37*a*, an intermediate portion 37*b*, and an upper portion 37*c*. The passage 37 is generally rectangular in cross-section, as can be best seen in FIGS. 4 and 6, and the short sides of the passage are rounded so as to accommodate the cylindrical portions of the small hole spindle 14. Passage portions 37*b* and 37*c* are axially offset from passage portion 37*a*, as can be best seen in FIGS. 2 and 3, to define a shoulder 39 under which the shelf 28 is located in the record supporting position of the small hole spindle member 19. As can be seen in FIG. 6, inwardly directed ribs 35 are provided in passage portion 37*a*, and include arcuate surfaces for slidably guiding the spindle adapter onto the small hole spindle 14. As is clear from FIG. 6, ribs 35 are spaced sufficiently far enough from one another so that the small hole spindle member 19 will pass therebetween without interference. Spindle portion 27 is relatively closely confined within passage portion 37*c* (FIG. 5) to hold the adapter 30 against rotation relative to the small hole spindle 14. As is clear from FIGS. 2 and 3, the passage portions 37*b* and 37*c* are sufficiently large to enable the small hole record spindle 19 to move from the record supporting to the record ejecting position without interference.

With the rectangular cross-section of the adapter 30, a pair of straight sides 42 and 43 are provided which have a length dimension greater than a pair of connecting sides 44 and 45. The sides 44 and 45 have their faces curved to correspond to the curvature of the center hole 46 of a large hole record 47 to accurately guide the record and to minimize the frictional drag thereon during rotation thereof.

A record supporting shelf for the spindle adapter is provided by a pair of shoulders 50 and 51 formed at the upper end of the adapter lower section 35, and which are at a level generally the same as the level of the shelf 28 of the small hole record spindle 14. The curved side 45 of the spindle adapter at the upper section 36 thereof is inclined downwardly and inwardly, as shown in FIGS. 2 and 3, to define shelf shoulders 50 and 51; and the opposite curved side 44 of the adapter at the upper section 36 is correspondingly sloped downwardly and outwardly, as shown in FIGS. 2 and 3, to positively guide a record down onto the adapter shelf. The sloped side, last referred to, terminates a distance above the adapter shelf at least equal to the thickness of a large hole record, so that a record may shift to the left, as viewed in FIGS. 2 and 3, off the adapter shelf.

A compartment 53 is provided in the spindle adapter between side 45 and passage 37, and is defined in part by an upwardly inclined lower wall 54. Compartment 53 includes a first opening 55 at the upper end thereof communicating with passage portion 37*b*, and a second opening 56 therein is provided adjacent shoulders 50 and 51. A push off member in the form of a lever 58 is pivotally mounted in compartment 53 by a transverse pin 59 which extends through an elongated opening 60 in the lower portion of the lever. A first portion 61 of the lever 58 extends outwardly of the compartment 53 through opening 55 where it bears against the cylindrical section 26 of small hole spindle 19, and a second portion 62 of the lever 58 is positioned to move outwardly of the opening 56 upon pivoting of the lever 58 from the position of FIG. 2 to the position of FIG. 3. A helical spring 63 is positioned in a suitable spring mount 64 on the inner face of adapter side 45, and bears against lever 58 to bias the same in a clockwise direction as viewed in FIGS. 2 and 3. A wall 65 at the upper end of wall 54 provides means for limiting the clockwise pivoting of lever 58 (as viewed in FIGS. 2 and 3), and the engagement of lever portion 61 with the forward wall of passage portion 37*b* (as viewed in FIGS. 2 and 3) limits the counterclockwise pivoting of the lever 58.

Thus, assuming that a stack of large hole records is threaded on the upper portion 36 of the spindle adapter with the lowermost record in the record stack resting upon the shelf defined by shoulders 50 and 51, when a record change cycle is effected, actuating member 21 will engage the small hole spindle portion 19 to pivot the same in a counterclockwise direction from the record supporting position of FIG. 2 to the record ejecting position of FIG. 3. As the small hole spindle member 19 moves from the position of FIG. 2 to the position of FIG. 3, the cylindrical section 26 thereof pivots the lever 58 in a counterclockwise direction about pin 59, and lever portion 62 moves outwardly of opening 56 to engage the center hole 46 of the large hole record 47 on the shoulders 50 and 51. The record is then shifted to the left as viewed in FIGS. 2 and 3 into position where it is free to move downwardly into engagement with the turntable 13. After the lowermost record in the record stack has been ejected, the next lowermost record will move downwardly into engagement with the portion 62 of lever 58, and the engagement of pin 59 with opening 60 will allow the lever 58 to move downwardly in the compartment 53. A boss 66 on lever 58 is closely confined within spring 63, so that when the lever 58 is moved downwardly by engagement of a record with the lever portion 62, the spring 63 will shift the lever 58 upwardly into the position shown in FIG. 2 when the small hole spindle member 19 pivots in a clockwise direction under the urging of spring 29.

From the foregoing it will be readily apparent that a spindle adapter has been provided which may be readily placed over a small hole record spindle, and provide for automatic changing of large hole records solely by the use of the existing ejector mechanism of the small hole record spindle. Additionally, an adapter has been provided in which a minimum number of moving parts are utilized. Still further, the adapter is shaped so as to accurately guide the records during playing thereof, and to support the same in a stable manner when they are carried by the adapter.

We claim:

1. A spindle adapter for use with a rotatable phonograph turntable and a spindle of relatively small diameter for records having center holes of correspondingly small diameter, said spindle having a shiftable upper end portion movable between a record supporting position and a record ejecting position for laterally shifting a record relative to said spindle in combination, an adapter body for supporting and centering a stack of records with large diameter center holes, said body having a passage extending for substantially the entire length thereof for placement on said spindle, the portion of said passage for reception of said spindle upper end portion being larger than said spindle end portion so that movement of said spindle end portion from record supporting position to record ejecting position can take place when said adapter body is placed on said spindle; means at the top of said body engageable with the upper end portion of the spindle to position said body on the spindle and to guide said spindle end portion in moving from record supporting position to record rejecting position, a shelf on said body for supporting a stack of records, an opening in said body adjacent said shelf, a lever pivotally mounted on said body and having a first portion positioned in said passage portion and engageable with said shiftable spindle portion and a second portion positioned to extend outwardly of said opening and move across said shelf, means at the lower portion of said body for rotatably supporting records, and means on said body at the side opposite said shelf sloped to lead the record stack down onto said shelf and terminating at a level a record thickness above the shelf whereby actuation of the shiftable spindle portion moves the second portion of the lever outwardly of said opening and across the shelf to shift a record off the shelf and beneath the sloped means whereupon the ejected record is free to move onto said turntable while the sloped means guides the succeeding record at the bottom of the record stack onto said shelf.

2. A spindle adapter for use with a rotatable phonograph turntable and a spindle of relatively small diameter for records having center holes of correspondingly small diameter, said spindle having a shiftable portion for laterally shifting a record relative to said spindle, in combination, a generally rectangular adapter body for supporting and centering a stack of records with large diameter center holes, said rectangular body having a dimension in one direction almost equal to the diameter of the hole of a large center hole record and a lesser dimension in a transverse direction, said body having a passage extending for substantially the entire length thereof for placement on said spindle and means for positioning said body on the spindle, a shaft on said body for supporting a stack of records, a member pivotally mounted on said body and having a first portion positioned in said passage and engageable with said shiftable spindle portion and a second portion positioned to move across said shaft, said member having means enabling the same to move generally vertically relative to said body, means urging said member upwardly relative to said body means on said body at the side opposite said shelf sloped to lead the record stack down onto said shelf and terminating at a level a record thickness above the shelf whereby actuation of the shiftable spindle portion moves the second portion of the member across the shelf to shift a record off the shelf and beneath the sloped means, and a part of said body beneath the shelf guides a record onto the turntable while the sloped means guides the succeeding record at the bottom of the record stack first onto said member to move the same generally vertically downwardly and then guides said succeeding record at the bottom of the record stack onto said shelf.

3. A spindle adapter for use with a record changer having a rotatable turntable and a non-rotatable spindle for records having center holes of small diameter, said spindle having a shiftable spindle portion, in combination, an adapter body for supporting and centering a stack of records with large diameter center holes, said body having an axially directed passage for placement on said spindle, means on the adapter body engageable with the spindle to lock the adapter against rotation with the turntable, means defining a support position for large hole records intermediate the top and bottom of the adapter to hold records at a support level, a single pivotally mounted member supported for limited generally vertical movement on said adapter body adjacent said support level and in position for direct actuation by said shiftable spindle portion, means urging said member upwardly relative to said body, means at the upper part of said body for guiding the lowermost record of a large hole record stack to said support level, said adapter having a generally rectangular shape of a size to fit within the center hole of a large hole record, the lower end adapted to fit within the center hole of a record on the turntable, at least on convexly shaped surface at said lower end extending arcuately for a minor part of the record hole periphery to obtain guiding of the record on the turntable with minimal frictional retardation of the record, and opposite surfaces extending away from said convexly shaped surfaces and spaced a distance apart equal to a minor part of the hole diameter of the large hole record to avoid contact with a record hole periphery and thereby avoid frictional contact with a record on the turntable.

4. A spindle adapter for use with a record changer having a rotatable turntable and a stationary spindle for records having center holes of small diameter, said spindle having a shiftable spindle portion, in combination, an adapter body for supporting and centering a stack of records with large diameter center holes and having a generally rectangular shape from top to bottom of a size to fit within the center hole of a large hole record, said body having an axially directed passage for placement on said spindle, means on the adapter body engageable with the spindle to lock the adapter to the spindle and against rotation with the turntable, means defining a support position for large hole records intermediate the top and bottom of the adapter to hold records at a support level, means at the upper part of said body for guiding the lowermost record of a large hole record stack to said support level, and a single pivoted actuating member mounted for limited generally vertical movement on said adapter body, said actuating member being directly operatively responsive to the shifting of said spindle portion for ejecting large hole records off of said support level, and means urging said member upwardly relative to said body.

5. A spindle adapter for use with a rotatable phonograph turntable and a spindle of relatively small diameter for records having center holes of correspondingly small diameter, said spindle having record ejecting means in combination, a generally rectangular adapter body for supporting and centering a stack of records with large diameter center holes, said rectangular body having a dimension in one direction almost equal to the diameter of the hole of a large center hole record and a lesser dimension in a transverse direction, said body having a passage extending for substantially the entire length thereof for placement on said spindle and means at the top of said body engageable with the upper end of the spindle to position said body on the spindle, a shelf on said body for supporting a stack of records, a single member mounted on said body for pivotal and generally vertical movement relative thereto and adapted to be directly actuated by said record ejecting means, said member having a portion positioned to move across said shelf, and eject a large hole record supported thereon, means on said body at the side opposite said shelf sloped to lead the record stack down onto said shelf and terminating at a level a record thickness above the shelf whereby actuation of the record ejecting means moves the portion of the movable member across the shelf to shift a record off the shelf and beneath the sloped means whereupon the ejected record is free to move onto said turntable while the sloped means guides the succeeding record at the bottom of the record stack onto said shelf.

6. A spindle adapter for use with a record changer having a small hole record spindle with a generally cylindrical first body portion, a slot extending from end to end of said body portion, a second body portion pivotally mounted in said slot and extending vertically above said first body portion, a record supporting shelf on said second body portion and movable between a record supporting position outwardly of said slot and a record ejecting position within said slot, said spindle adapter comprising an adapter body for supporting and centering a stack of records with large diameter center holes, said body having a passage extending for substantially the entire length thereof for placement on said spindle and means at the top of said body engageable with the upper end of the spindle to position said body on the spindle, a shelf on said body for supporting a stack of records, a compartment in said body and having a first opening communicating with said passage and a second opening adjacent said shelf, a lever pivotally mounted in said compartment and having a first portion extending outwardly of said first opening into said passage and engageable with said spindle second body portion, said lever having a second portion movable out of said second opening and across said shelf, spring means biasing said lever toward a position wherein said second lever portion is disposed within said compartment, said adapter body including means mounting said lever for limited vertical movement with respect thereto, means at the lower portion of said body for rotatably supporting records, and means on said body at the side opposite said shelf sloped to lead the record stack down onto said shelf and terminating at a level a record thickness above the shelf whereby actuation of the shiftable spindle portion moves the second portion of the lever through said second opening and across the shelf to shift a record off the shelf and beneath the sloped means whereupon the ejected record is free to move onto the record supporting means while the sloped means guides the succeeding record at the bottom of the record stack onto said shelf.

7. A spindle adapter as defined in claim 6 wherein said spring means is arranged to bias said lever upwardly.

References Cited

UNITED STATES PATENTS

| | | | |
|---|---|---|---|
| 2,761,687 | 9/1956 | Da Costa | 274—10 |
| 2,884,255 | 4/1959 | Wennerbo et al. | 274—10 |
| 2,919,924 | 1/1960 | Wilton | 274—10 |
| 3,273,895 | 9/1966 | Simpson | 274—10 |

FOREIGN PATENTS

| | | |
|---|---|---|
| 180,415 | 12/1954 | Austria. |

HARRY N. HAROIAN, *Primary Examiner.*

LEONARD FORMAN, *Examiner.*